Figure 1:
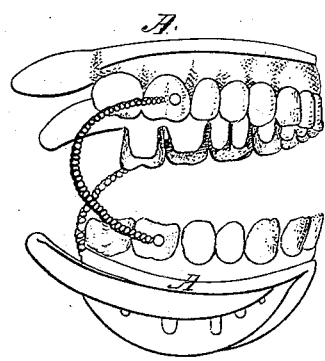
Figure 2:
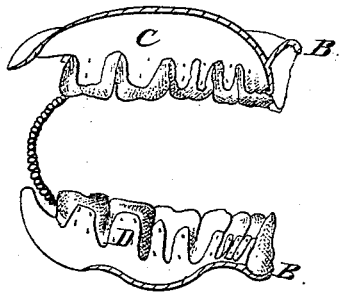

M. S. Foster,

Articulating Teeth.

N° 2,849.     Patented Nov. 12, 1842.

UNITED STATES PATENT OFFICE.

M. S. FOSTER, OF TRENTON, NEW JERSEY.

SETTING TEETH.

Specification of Letters Patent No. 2,849, dated November 12, 1842.

*To all whom it may concern:*

Be it known that I, MATTHEW S. FOSTER, of the city of Trenton, in the county of Mercer and State of New Jersey, have invented a new and valuable Improvement upon the Mounting Formerly Used in the Insertion of Artificial Incorruptible Silicious Teeth; and I do hereby declare that the following is a full and exact description.

The nature of my invention consists in soldering a strip of gold or silver of the thickness of a half worn six pence, and an eighth of an inch in width, more or less, to the outer edges of the superior and inferior plates of gold or silver designed and prepared to have incorruptible teeth, with artificial gums, fastened upon them, which teeth are usually made in three sections to each plate for whole sets, but varying with some dentists, from a single tooth, to two, making seven sections to each plate when completed.

The object of my improvement is firstly, to exclude all the secretions of the mouth from between the teeth and plates of gold or silver, thereby rendering them entirely free from foreign and impure matter, which is liable to accumulate between the plate, and teeth with gums, set in the ordinary way. Secondly, to offer an abutment, or point of resistance for the teeth, much more secure than can be obtained in any other way that has heretofore been attempted.

To enable those skilled in the art to make use of my invention, I will proceed to describe the method by which I accomplish my improvement upon the method of setting teeth.

I construct the ordinary C plates so as to fit the mouths of my patients, after which, I construct my teeth with gums, so as to fit the plates accurately, and these I fasten to the plates by warm beeswax on the inside of the teeth. After placing them in their proper position, I take a piece of sheet tin, or lead, as thin as ordinary writing paper, and of an inch in width, and length sufficient to extend from the back part of the posterior molar tooth on one side, to the same point of the corresponding tooth on the other side, then, by placing this tin or lead on the outer edge of the plate, and turning it around the top edge of the gums that is in contact with the plate, bending it downward up on them from molar to molar tooth, and running the thumbs and fingers on the outer edge of the plate so as to fit closely, and get an accurate impression of said edge of the plate, and by cutting off that portion which partly overlaps the concave surface of the plate C, I then, as a pattern, that part which extends from the plate downward toward the edges and grinding surfaces of the teeth. This pattern I cut an eighth of an inch wide designed to be soldered to the edge of the plate, throughout its whole length. After having thus obtained a pattern, I take a piece of gold or silver of the thickness of a half worn sixpence, and of surface sufficient to allow the pattern to be placed upon it, so as to enable me to cut an accurate duplicate. After which, I take this duplicate, it being part annealed, and bind it with pliers, or otherwise, so as to have it extend from the back part of one posterior molar tooth, to the back part of the corresponding tooth on the other side, and after filing and regulating the edge so as to fit neatly upon the plate C, and adjusting the edge of this strip which is to be burnished up close to the gums, so as to incline a little outward from them, I remove the teeth from the plate, and tie the strip of gold or silver in its proper place, by means of wire. I then solder it there by gold or silver solder. The next operation is to cut away all the surplus solder, if any should remain, and to replace the teeth upon the plate, bringing the edges of the strip A neatly up to the gums. Then inverting the plate W by casting plaster of Paris upon the exterior surface of the teeth and gums, and over the edges of the incisors, and crowns of the other teeth, and covering the concave surface of the plate with it, from one to two inches in thickness, and removing all that may have happened to come in contact with the stays D of the teeth, and convex surface of the plate to which they are to be soldered for the purpose of retaining them in place preparatory to soldering having sufficient borax and solder upon the stays and plate, I dry the whole, by bringing it gradually to a dark red heat in the stove or otherwise. I then remove the whole from the fire upon a piece of charcoal, and bring the parts to be soldered under the flame from a blow pipe, until that is effected after which the whole is allowed to cool. The plaster is now broken off, and the strip is filed thin toward the edge, and burnished up close to the gums, so as to prevent the secretions spoken of getting between them and the plate. The whole is now cleaned, burnished, and ready for the patient.

For a better understanding of my invention, reference is made to the annexed drawings, the different parts being described by letters of explanation accompanying them.

What I claim as my invention and desire to secure by Letters Patent is—

Constructing the plate upon which the artificial teeth with gums are to be fastened, with the flange on turned edge A for the purpose of adding strength to the arch and preventing the introduction of secretions between the joints.

M. S. FOSTER.

Witnesses:
 HENRY STONE,
 CH. L. FLEISCHMANN.